United States Patent
Wong et al.

(10) Patent No.: US 11,691,731 B2
(45) Date of Patent: Jul. 4, 2023

(54) PACKAGE DELIVERY SYSTEMS AND RELATED METHODS

(71) Applicant: Insitu, Inc., Bingen, WA (US)

(72) Inventors: John Richard Wong, Klickitat, WA (US); Derek Suggs, Stevenson, WA (US)

(73) Assignee: Insito, Inc., Bingen, WA (US)

( * ) Notice: Subject to any disclaimer, the term of this patent is extended or adjusted under 35 U.S.C. 154(b) by 104 days.

(21) Appl. No.: 17/482,258

(22) Filed: Sep. 22, 2021

(65) Prior Publication Data

US 2023/0091849 A1 Mar. 23, 2023

(51) Int. Cl.
| | |
|---|---|
| *B64D 1/12* | (2006.01) |
| *B64C 39/02* | (2023.01) |
| *B64D 1/22* | (2006.01) |
| *B64U 10/13* | (2023.01) |
| *B64U 101/60* | (2023.01) |

(52) U.S. Cl.
CPC .............. *B64D 1/12* (2013.01); *B64C 39/024* (2013.01); *B64D 1/22* (2013.01); *B64U 10/13* (2023.01); *B64U 2101/60* (2023.01)

(58) Field of Classification Search
CPC . B64D 1/12; B64D 1/22; B64U 10/13; B64U 2101/60; B64U 2101/64
See application file for complete search history.

(56) References Cited

U.S. PATENT DOCUMENTS

| | | | |
|---|---|---|---|
| 5,161,705 A | * 11/1992 | Takai | ................. B66C 1/12 294/75 |
| 2013/0259634 A1 | * 10/2013 | Raz | ................. B66C 1/12 414/801 |
| 2019/0248490 A1 | * 8/2019 | Jones | ............... B64C 39/024 |

* cited by examiner

*Primary Examiner* — Tye William Abell
(74) *Attorney, Agent, or Firm* — Kolitch Romano Dascenzo Gates LLC

(57) ABSTRACT

Delivery systems for aerial vehicles include a plurality of securement straps configured to secure a package during flight of an aerial vehicle, at least one retaining strap, and a release mechanism. A proximal end region of each securement strap and a first end region of the at least one retaining strap are coupled to the aerial vehicle. A distal end region of each securement strap is coupled to the release mechanism such that when the release mechanism is actuated the release mechanism releases the distal end region of at least one securement strap of the plurality of securement straps, thereby delivering the package. The release mechanism remains coupled to a second end region of the at least one retaining strap when the release mechanism is actuated such that the securement straps, release mechanism, and retaining strap all may be pulled up and away from the package after delivery.

20 Claims, 6 Drawing Sheets

PACKAGE DELIVERY SYSTEMS AND RELATED METHODS

FIELD

The present disclosure relates generally to a package delivery system and related methods.

BACKGROUND

Aerial vehicles (e.g., unmanned aerial vehicles, or "UAVs") used to deliver packages typically involve complex package release systems to release the package from the aerial vehicle at the appropriate time and place. Such complex package release systems tend to be costly and are prone to delivery errors such as releasing the package too early and/or failing to release the package at the appropriate time. Some existing solutions involve delivering the package while the UAV hovers above the delivery surface, but these solutions require use of a proprietary delivery box, which is lowered to the delivery surface on a line and/or gripped using a complex gripping mechanism. The need for use of a specific, proprietary delivery box results in a system that lacks flexibility and also creates extra costs.

Other existing solutions utilize regular (i.e., non-proprietary) boxes, but require the UAV to land in order to deposit the box on the ground. Landing the UAV, however, presents a risk of injury and/or damage that may be difficult to eliminate. For example, children or dogs dashing out to interact with the UAV as it lands could be injured by spinning blades or other contact with the UAV. Landing also puts the UAV at risk for damage from unpredictable and/or criminal encounters. Furthermore, in some situations, landing may be undesirable or unfeasible due to the terrain or other environmental considerations. There remains a need for a package delivery system able to deliver regular (i.e., non-proprietary) boxes of various shapes and sizes that are typical of existing deliveries, especially for entities with large volumes of package deliveries and/or entities that desire to make deliveries as-packaged by their own customers.

SUMMARY

Presently disclosed delivery systems for aerial vehicles advantageously may provide a delivery system that is configured hover a safe height above a delivery surface and deliver an arbitrary or regular package, or box. Such disclosed delivery systems and methods may protect the UAV during delivery (e.g., from damage that may occur due to landing and/or being accessible on the delivery surface), as well as protecting the surroundings at the delivery location and the contents of the package being delivered. Such disclosed delivery systems may be simple and reliable, as opposed to prior art systems that involved landing the UAV, proprietary boxes, and/or complex mechanisms for delivery.

For example, a delivery system for an aerial vehicle may include a plurality of securement straps configured to secure a package with respect to the aerial vehicle such that the package is supported during flight of the aerial vehicle. Each securement strap may extend from a respective proximal end region to a respective distal end region, with the proximal end region of each securement strap being coupled to the aerial vehicle. Disclosed systems also may include at least one retaining strap. A first end region of the at least one retaining strap may be coupled to the aerial vehicle, and a second end region of the at least one retaining strap may be coupled to a release mechanism of the delivery system.

The distal end region of each securement strap may be coupled to the release mechanism, and the delivery system may be configured such that when the release mechanism is actuated, the release mechanism releases the distal end region of at least one securement strap, thereby delivering the package. The release mechanism may be configured to remain coupled to the second end region of the at least one retaining strap when the release mechanism is actuated. In this manner, the securement straps and the retaining strap may release the package from the aerial vehicle to deliver it, while the securement straps and the retaining strap still remain coupled to the aerial vehicle at one end, such that the delivery system may be pulled by and/or retracted in the aerial vehicle to return away from the delivery location. In this manner, disclosed delivery systems may be configured to deliver a package without leaving additional materials from the delivery system behind.

Presently disclosed methods for delivering a package via a delivery system for an aerial vehicle generally may include securing the package to the aerial vehicle via a plurality of securement straps, such that the package is supported during flight of the aerial vehicle, and positioning a release mechanism on or adjacent a lower side of the package. The plurality of securement straps may be coupled to the release mechanism, and at least one retaining strap also may be coupled to the release mechanism. Once the aerial vehicle approaches a delivery location surface, the package may be lowered towards the delivery location surface while the aerial vehicle remains at a minimum predetermined height above the delivery location surface. The release mechanism may be automatically (e.g., passively) actuated when the release mechanism contacts the delivery location surface. The release mechanism may be configured to disengage the plurality of securement straps upon being actuated, thereby delivering the package by depositing the package on the delivery location surface.

DESCRIPTION

Figure 1:
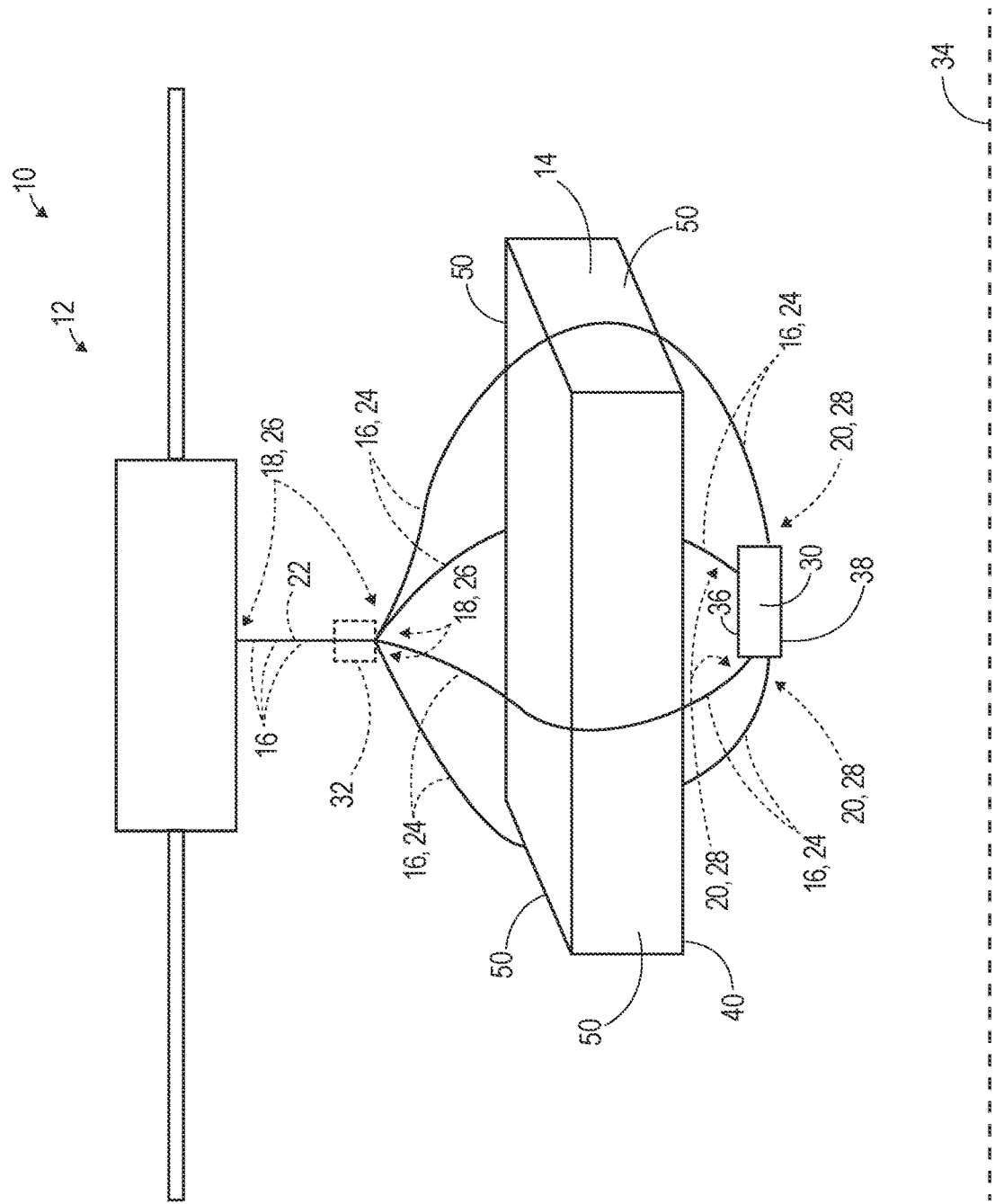
FIG. 1 is a schematic representation of illustrative, non-exclusive examples of delivery systems according to the present disclosure.

FIGS. 1-6 schematically provide illustrative, non-exclusive examples of delivery systems 10 according to the present disclosure. Elements, components, and/or features that are discussed herein with reference to each of FIGS. 1-6 may be included in and/or utilized with any of the examples shown in other figures herein without departing from the scope of the present disclosure. In general, elements that are likely to be included in a given (i.e., a particular) example are illustrated in solid lines, while elements that are optional to a given example are illustrated in dashed lines. However, elements that are shown in solid lines are not essential to all examples, and an element shown in solid lines may be omitted from a particular example without departing from the scope of the present disclosure.

Delivery systems 10 according to the present disclosure generally are configured to be delivery systems 10 for an aerial vehicle 12, such as to deliver a package 14 from aerial vehicle 12. While it is understood based on the disclosure herein that disclosed delivery systems 10 may be configured for use with aerial vehicles 12 (e.g., unmanned aerial vehicles, or UAVs, sometimes referred to as "drones," which may be automated via an on-board control system and/or processor, and/or which may be remote operated), a representation of aerial vehicle 12 is not shown in every figure. Any aerial vehicle 12 that may be used to deliver a package 14 may be outfitted and/or retrofitted with disclosed delivery system 10, and/or disclosed delivery system 10 may include aerial vehicle 12 as a standalone kit. Of course, disclosed delivery systems 10 also may be used with piloted aerial vehicles.

Delivery system 10 includes a plurality of securement straps 16 configured to secure package 14 with respect to aerial vehicle 12, such that package 14 is supported during flight of aerial vehicle 12. For example, securement straps 16 may be configured to retain package 14 hanging down below aerial vehicle 12, near a body of aerial vehicle 12, at least partially within an internal volume of aerial vehicle 12, and/or against a surface of aerial vehicle 12. In some examples, package 14 is towed behind and below aerial vehicle 12 during flight towards a delivery location surface 34 where package 14 is to be delivered. In some examples, aerial vehicle 12 may include a cutout or recess, similar to an aerial crane (e.g., Skycrane®), which may partially contain package 14 during flight, thereby reducing drag and improving aerodynamics. In some examples, securement straps 16 and package 14 may be positioned at least partially externally from aerial vehicle 12, though securement straps 16 may nonetheless be configured to restrain, contain, support, and/or secure package 14 within securement straps 16 such that package 14 does not fall out from securement straps 16 during a flight of aerial vehicle 12. Any suitable number of securement straps 16 may be used to secure package 14. Some examples of delivery system 10 include a respective securement strap 16 placed about each respective side of package 14. Some examples of delivery system 10 include just two securement straps 16. Some examples of delivery system 10 include a respective securement strap 16 placed about a subset of the sides of package 14. Some examples of delivery system 10 include two or more securement straps 16 placed about one, some, or all of the sides of package 14. The specific number of securement straps 16 used in a particular example of delivery system 10 may be varied, or selected, depending on the size of package 14, the shape of package 14, the weight of package 14, the configuration of aerial vehicle 12, and/or the type of straps used for securement straps 16.

Each securement strap 16 extends from a proximal end region 18 to a distal end region 20. Proximal end region 18 of each securement strap 16 may be coupled to aerial vehicle 12, while distal end region 20 of each securement strap 16 may be coupled to a release mechanism 30 of delivery system 10. Proximal end region 18 of each securement strap 16 is coupled to aerial vehicle 12 in any suitable fashion. For example, proximal end region 18 of each securement strap 16 may be coupled to aerial vehicle 12 via one or more fasteners, a spool, a wheel, a retractable spool, a hook, a knot, a carabiner, a clip, and/or any other suitable structure and/or mechanism. In some examples, proximal end region 18 may be coupled directly to aerial vehicle 12. Additionally or alternatively, proximal end region 18 of each securement strap 16 may be coupled to, or joined together to form, a main line 22 that is coupled to aerial vehicle 12 such that it may extend downward from aerial vehicle 12.

Delivery system 10 also includes at least one retaining strap 24. Each retaining strap 24 may be configured to retain package 14 along with securement straps 16. In other words, retaining strap 24 is generally configured to operate together with securement straps 16 to secure package 14 with respect to aerial vehicle 12. In some examples, however, retaining strap 24 may be redundant, such that securement straps 16 are sufficient on their own to secure package 14 with respect to aerial vehicle 12, while in other examples, securement straps 16 may be insufficient to secure package 14 on their own without one or more retaining straps 24 as well. A first end region 26 of each retaining strap 24 is coupled to aerial vehicle 12 (e.g., directly coupled to aerial vehicle 12 and/or coupled to main line 22), and a second end region 28 of each retaining strap 24 is coupled to release mechanism 30. The schematic of FIG. 1 shows four straps securing package 14 with respect to aerial vehicle 12, any of which may be configured to be a securement strap 16, and any of which may be configured to be a retaining strap 24. In a representative example of delivery system 10, one of the four illustrated straps is a retaining strap 24, while the other three illustrated straps are securement straps 16, though in other examples, other arrangements are possible, with more or fewer securement straps 16 and/or more than one retaining strap 24.

Distal end region 20 of each securement strap 16 is coupled to release mechanism 30. Delivery system 10 is configured such that when release mechanism 30 is actuated, release mechanism 30 releases distal end region 20 of at least one securement strap 16, thereby releasing package 14 from securement straps 16 to deliver package 14 at a delivery location (e.g., delivery location surface 34). In typical examples, release mechanism 30 releases the distal end region 20 of all securement straps 16 coupled to release mechanism 30 when release mechanism 30 is actuated, though in some examples release of just one or a subset of securement straps 16 from release mechanism 30 may be sufficient to release and thereby deliver package 14. Release mechanism 30 is configured to remain coupled to second end region 28 of retaining strap(s) 24 when release mechanism 30 is actuated. In this manner, release mechanism 30 remains coupled to aerial vehicle 12 (via retaining strap(s) 24 and/or main line 22) after release mechanism 30 is actuated and package 14 is delivered, such that package 14 may be delivered without leaving behind any securing materials or components of delivery system 10.

Figure 2:
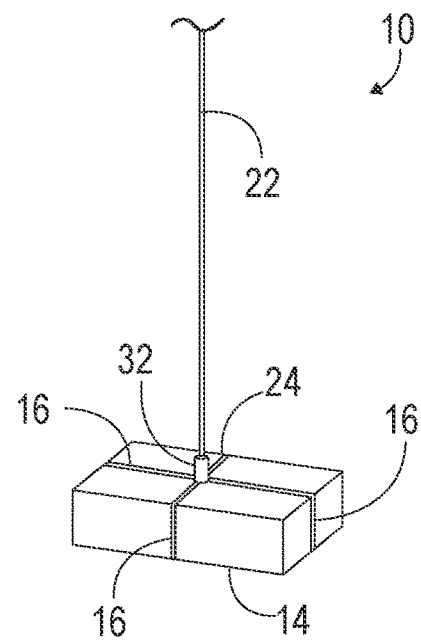
FIG. 2 is a schematic representation of a package secured by presently disclosed delivery systems.

In some examples, delivery system 10 includes a cinch 32, which may be positioned about main line 22 and/or about one or more of securement straps 16 and/or retaining straps 24. In some examples, a single cinch 32 may be used to cinch together and tighten all securement straps 16 and retaining strap(s) 24 about package 14. Cinch 32 may be selectively translated along the length of main line 22, such that it may be selectively moved towards aerial vehicle 12 (e.g., generally upwards) or towards package 14 (e.g., generally downward). Cinch 32 may be configured to tighten securement straps 16 and/or retaining strap(s) 24 about package 14 to secure package 14 with respect to aerial vehicle 12. Cinch 32 may be, for example, a spring-loaded cord lock. In other examples, cinch 32 may simply be a knot or loop formed around securement straps 16 and retaining strap(s) 24. FIG. 1 illustrates cinch 32 in a position spaced apart from package 14, with securement straps 16 and retaining strap 24 being fitted loosely about package 14 while package 14 is inserted between the straps, while FIG. 2 schematically represents cinch 32 having been moved downward to a position adjacent package 14, such that securement straps 16 and retaining strap 24 are snug or taut about package 14, thereby securing package 14 with respect to aerial vehicle 12. Cinch 32 may be spring-loaded or otherwise biased in some examples, such that it applies a force to securement straps 16 and retaining strap(s) 24 that is sufficient to keep securement straps 16 and retaining strap(s) 24 secure about package 14 during flight of aerial vehicle 12.

With continued reference to FIG. 1, release mechanism 30 may be positioned on or adjacent a bottom side 48 of package 14. Securement straps 16 may be positioned to extend along respective sides 50 of the package 14 and may be joined together on bottom side 48 of package 14 via release mechanism 30. Securement straps 16 and retaining strap(s) 24 may be spaced and positioned about package 14 such that once securement straps 16 and retaining strap(s) 24 are tightened about package 14, there are no spaces that would be big enough to allow package 14 to slip through during flight. While securement straps 16 and retaining strap(s) 24 are illustrated as being positioned about mid-way along the length of each respective side 50, in other examples, different positioning may be used. Additionally or alternatively, one or more sides 50 of package 14 may have two or more securement straps 16 and/or retaining strap(s) 24 positioned thereabout. Securement straps 16 may be configured to be pre-secured to release mechanism 30 and then cinched down snug against package 14 once the package is positioned within securement straps 16.

Figure 3:
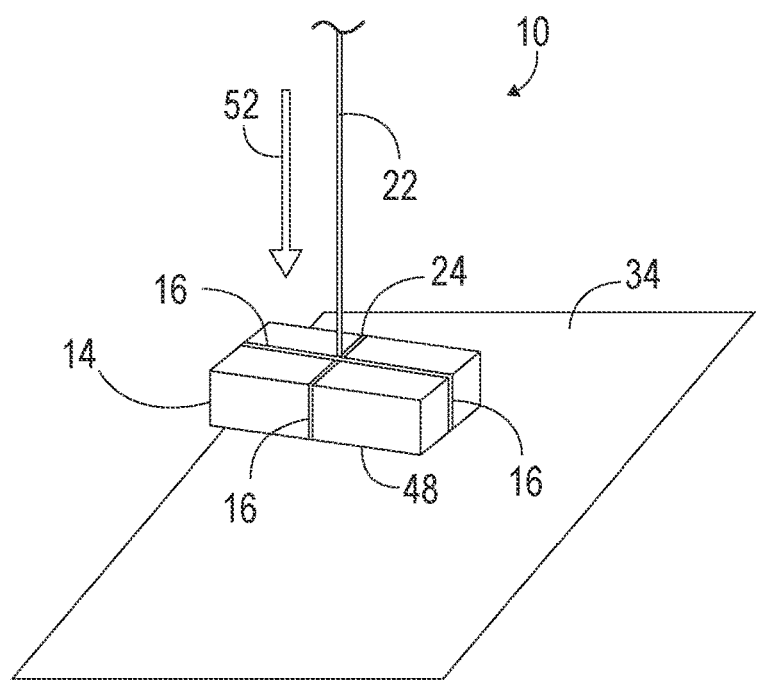
FIG. 3 is a schematic representation of presently disclosed delivery systems lowering a package towards a delivery location surface.
Figure 4:
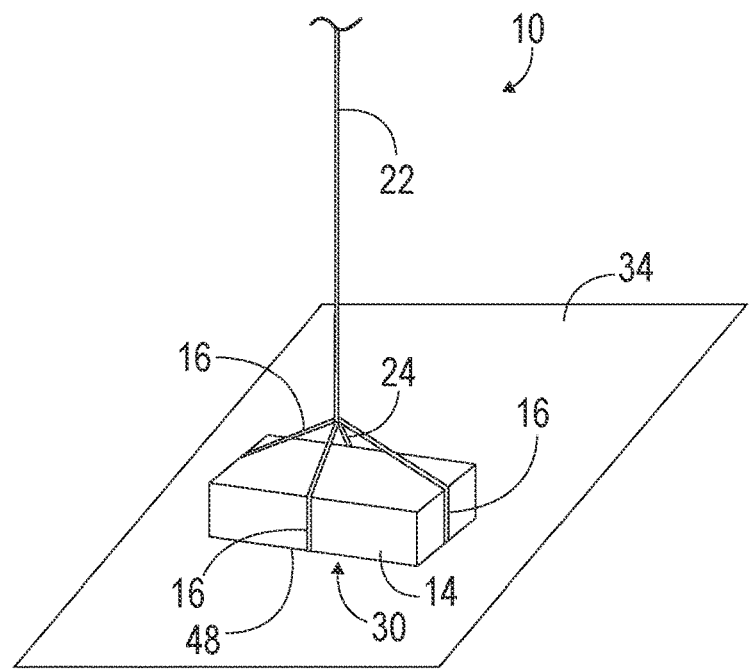
FIG. 4 is a schematic representation of presently disclosed delivery systems contacting a delivery location surface with a release mechanism of the delivery system.
Figure 5:
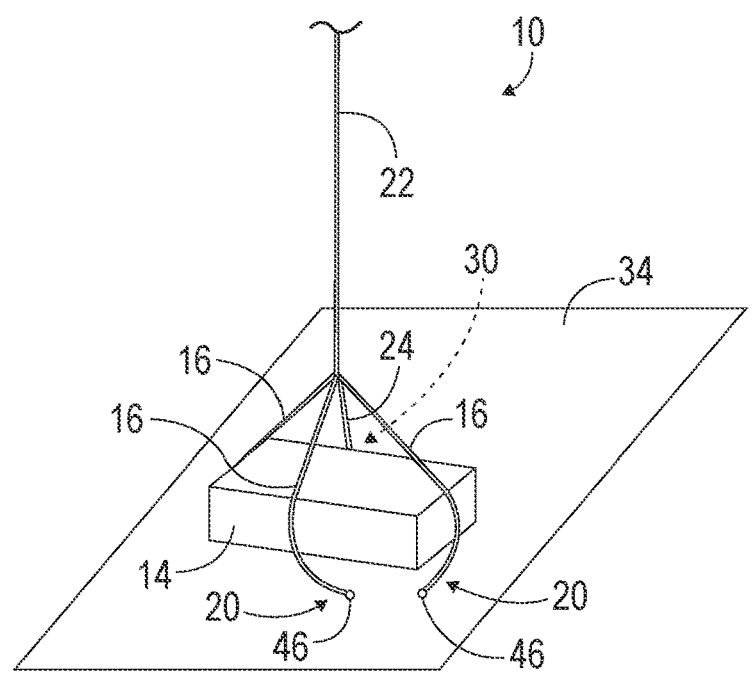
FIG. 5 is a schematic representation of presently disclosed delivery systems in the process of releasing a package on a delivery location surface.
Figure 6:
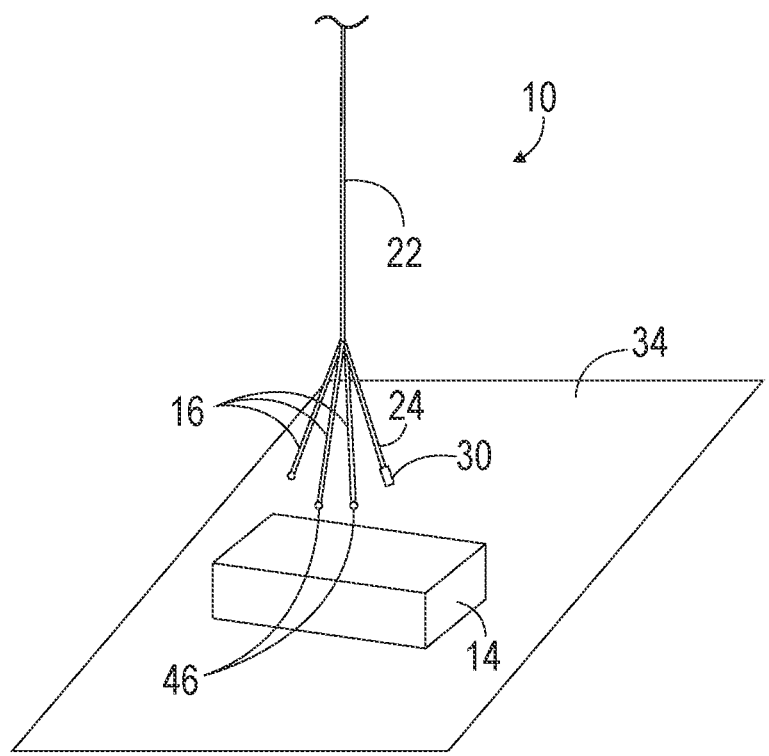
FIG. 6 is a schematic representation of presently disclosed delivery systems being pulled up, away from a delivered package.

Once package 14 is secured with respect to aerial vehicle 12, FIGS. 3-6 represent the general flow of delivering package 14 via disclosed delivery systems 10. Generally, aerial vehicle 12 will fly with package 14 towards a delivery location surface 34, and lower package 14 towards delivery location surface 34, as shown in FIG. 3. FIG. 4 shows package 14 being lowered to the point of contacting delivery location surface 34 with release mechanism 30 (which is positioned adjacent bottom side 48 of package 14 in this example), which actuates release mechanism 30 (which will be described in more detail herein). Once release mechanism 30 is actuated, securement straps 16 are released from their connection with release mechanism 30, as shown in FIG. 5, which functions to release package 14 from securement straps 16 of delivery system 10. Then, as shown in FIG. 6, securement straps 16, release mechanism 30, and retaining strap 24 are pulled out from under and away from package 14, leaving package 14 on delivery location surface 34 and thereby completing delivery of package 14. Release mechanism 30 remains coupled to retaining strap 24 (e.g., retaining strap 24 is not released from release mechanism 30 when release mechanism 30 is actuated), such that release mechanism 30 may be removed from the delivery site with the rest of delivery system 10 as aerial vehicle 12 departs. Disclosed delivery systems 10 thus are configured to deliver a plurality of different sizes and shapes of packages 14 (e.g., boxes, parcels, envelopes, bags, etc.) and may be used with virtually any size, shape, or type of package 14 due to the nature of securement straps 16 and retaining strap(s) 24 conforming to package 14. In this manner, delivery systems 10 may be used to deliver normal, or standard, packages 14 without special features, and without needing to use a proprietary box as is required in many prior art systems. In this manner, delivery system 10 may be utilized for large volume delivery by drone services, as it may be a simple, repeatable, low-cost, and reliable delivery system. Once a given package 14 is delivered, aerial vehicle 12 and the associated delivery system 10 may return to its original location (e.g., the warehouse, or other location from which packages are being delivered) or other location to retrieve another package 14 to be delivered. Release mechanism 30 may be reset, if needed, and the subsequent package 14 may be placed within and secured by securement straps 16 and retaining strap(s) 24 for the next delivery.

Release mechanism 30 may be passively actuated in some examples. For example, release mechanism 30 may be passively and automatically actuated when release mechanism 30 contacts a delivery location surface 34 and/or when package 14 contacts delivery location surface 34 on which delivery system 10 is configured to deliver package 14. In some examples, release mechanism 30 may be configured to be passively actuated without landing or contacting delivery location surface 34 with aerial vehicle 12. In other words, delivery systems 10 may be configured such that aerial vehicle 12 can deliver package 14 to delivery location surface 34 without landing aerial vehicle 12 on delivery location surface 34. Thus, presently disclosed delivery systems 10 may be configured to avoid or lessen the risk of the potential disadvantages of landing during delivery of package 14. To this end, release mechanism 30 and package 14 may be positioned during delivery of package 14 such that release mechanism 30 may be brought into contact with delivery location surface 34 while aerial vehicle 12 hovers a safe distance above delivery location surface 34.

Additionally or alternatively, release mechanism 30 may be actively actuated, such as via a remote operator. Various examples of delivery systems 10 may include release mechanisms 30 that are pressure actuated, electronically actuated, and/or actuated via one or more solenoids. For example, in examples of delivery systems 10 with release mechanisms 30 that are pressure actuated, release mechanism 30 may be configured to be actuated (and thereby release securement straps 16 to deliver package 14) by applying a predetermined threshold pressure to release mechanism 30, such as by contacting delivery location surface 34 with release mechanism 30 as package 14 is lowered towards delivery location surface 34. Additionally or alternatively, release mechanism 30 may be triggered, or actuated electronically, such as via a remote control operation, and/or via an onboard processor that electronically actuates the release when, for example, sensors detect contact between package 14 and delivery location surface 34, and/or a predetermined height above delivery location surface 34 is reached.

With reference to FIG. 1, in some examples, release mechanism 30 has an upper side 36 that faces and/or contacts package 14 (e.g., bottom side 48 of package 14) until package 14 is delivered, and a lower side 38 that faces away from package 14 while package 14 is in transit to delivery location surface 34. Release mechanism 30 may be actuated by contacting delivery location surface 34 with lower side 38 of release mechanism 30. For example, FIG.

3 schematically represents package 14 being lowered towards delivery location surface 34 (e.g., lowering package 14 in the direction indicated by arrow 52), and FIG. 4 schematically represents contacting delivery location surface 34 release mechanism 30 (e.g., with lower side 38 of release mechanism 30, visible in FIG. 1) to actuate release mechanism 30. Once release mechanism 30 is actuated, as schematically represented in FIG. 5, securement straps 16 and retaining strap 24 may be moved up towards aerial vehicle 12 and/or away from delivery location surface 34, and out from underneath package 14, thereby allowing package 14 to be delivered to delivery location surface 34 (e.g., placed on delivery location surface 34), as schematically represented in FIGS. 5-6. Thus, delivery systems 10 are configured to release package 14 onto delivery location surface 34 without having to land aerial vehicle 12 on delivery location surface 34. In other words, aerial vehicle 12 may remain in the air at a safe height above delivery location surface 34 during delivery of package 14, without having to drop package 14 from the height of aerial vehicle 12. In illustrative examples, aerial vehicle 12 may remain at least 10 feet, at least 20 feet, at least 30 feet, at least 40 feet, and/or at least 50 feet above delivery location surface 34 while package 14 is being delivered (though package 14 itself will be much closer to delivery location surface 34 when it is released, generally just a few inches, or less than a foot, above delivery location surface 34). In this manner, delivery systems 10 may be configured to deliver package 14 while aerial vehicle 12 remains at a safe distance above delivery location surface 34, such that it reduces the likelihood of being tampered with during delivery operations. Additionally or alternatively, such feature of disclosed delivery systems 10 may be useful where the terrain is rough or where there may be vegetation which would make landing by aerial vehicle 12 undesirable. Similarly, disclosed delivery systems 10 may make possible deliveries where there is no clear or safe spot to land aerial vehicle 12, such as for marine deliveries.

Once release mechanism 30 is actuated and package 14 is delivered, aerial vehicle 12 elevates further above (e.g., lifts away from) delivery location surface 34. This movement of aerial vehicle 12 away from delivery location surface 34 pulls securement straps 16, retaining strap(s) 24, and release mechanism 30 away from package 14 and delivery location surface 34 once package 14 has been delivered thereon. Additionally or alternatively, main line 22, securement straps 16, and/or retaining strap(s) 24 may be retracted into, against, and/or towards aerial vehicle 12 once package 14 is delivered. Thus, aerial vehicle 12 may depart and take delivery system 10 with it as it leaves package 14 on delivery location surface 34, because release mechanism 30 is pulled out from under package 14 as aerial vehicle 12 lifts away from delivery location surface 34 after package 14 is delivered thereon.

Delivery system 10 may include a winch, a retractable spool, a reel, and/or other form of cord retractor configured to pull securement straps 16, retaining strap(s) 24, and release mechanism 30 in towards aerial vehicle 12 after package 14 is delivered. In examples of delivery system 10 including main line 22, main line 22 may be a retractable line such that at least a portion of main line 22 may be selectively retracted into aerial vehicle 12. In this manner, in examples where main line 22 couples each securement strap 16 and retaining strap 24 to aerial vehicle 12, having main line 22 be a retractable line allows main line 22 to lower securement straps 16 and retaining strap(s) 24 away from aerial vehicle 12 towards delivery location surface 34, to deliver package 14, and then raise securement straps 16 and retaining strap(s) 24 towards and/or into aerial vehicle 12 after delivery as main line 22 is retracted back towards and/or into aerial vehicle 12. For example, main line 22 may be secured to a winch, a retractable spool, a reel, and/or other form of cord retractor included in delivery system 10 mentioned above. Main line 22 may be a distinct line to which securement straps 16 and retaining strap(s) 24 are coupled, or main line 22 may be a unit formed by combining securement straps 16 and retaining strap(s) 24 together.

Securement straps 16 and/or retaining strap(s) 24 can be, as examples and without being limited to the same, a wire, elastic bands or straps, static, a rope, dynamic, a line (e.g., fishing line), a thread, fibers, webbing, a bungee, a harness, a belt, a leash, a band, a tie, a twine, a cord, a string, cordage, a cable, a strand, tape, and/or a lanyard. In various examples of delivery systems 10, one or more securement straps 16 and/or retaining strap(s) 24 may be different from one another in terms of material, strength, elasticity, width, length, thickness, and/or weight.

In some examples, delivery system 10 includes a locking mechanism configured to prevent accidental release of package 14 during an emergency landing and/or above a predetermined altitude or elevation above delivery location surface 34. Such a locking mechanism may be configured to add an extra fallback mechanism to prevent early release of package 14 from its stored position within securement straps 16 and retaining strap(s) 24. For example, in the event of an emergency landing, the locking mechanism may be configured to retain package 14 within securement straps 16 even though release mechanism 30 may be in a position that would otherwise trigger delivery of package 14 by actuating release mechanism 30. For example, while the locking mechanism is engaged, package 14 may be retained within securement straps 16 even if a button 40 of release mechanism 30 is pressed (see FIG. 7), which would otherwise actuate release mechanism 30 and thereby allow for release and delivery of package 14.

Delivery systems 10 generally are configured for automatic, passive delivery of package 14, with said automatic passive delivery being tied to contact between release mechanism 30 and delivery location surface 34. Again, delivery systems 10 are configured to retain package 14 in a secured position until release mechanism 30 is actuated, thereby satisfying a delivery condition. In some examples, delivery systems 10 may be configured such that satisfying the delivery condition may be passively and mechanically determined, rather than relying on sensors and/or processing units. In some examples, sensors and/or processing units may be used in addition to passive actuation of release mechanism 30, such as to verify the position of aerial vehicle 12 and package 14 with respect to delivery location surface 34. In some examples, delivery system 10 and aerial vehicle 12 may be configured to deliver package 14 autonomously.

As used herein, package 14 can include any type of package or object suitable for delivery by aerial vehicle 12, including but not limited to boxes, cartons, envelopes, containers, food, pharmaceuticals or medicines, healthcare products or supplies, resupply goods, postal deliveries, samples, and/or equipment. Aerial vehicle 12 can be any manned or unmanned aerial vehicle, which may include drones, autonomous aircraft, remote-controlled aircraft, fixed wing aircraft, multi-rotor aircraft, single rotor aircraft, vertical take-off and landing aircraft (VTOL), and/or hybrid vertical take-off and landing (HVTOL) aircraft.

Figure 7:
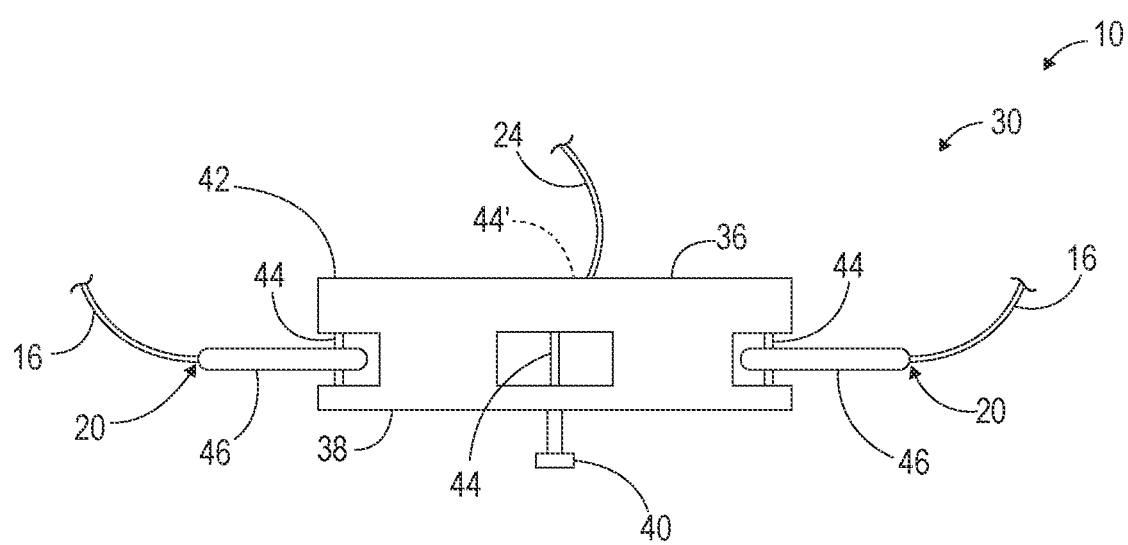
FIG. 7 is a side elevation view of an example of a release mechanism of presently disclosed delivery systems.

Turning now to FIG. 7, an illustrative non-exclusive example of a release mechanism 30 for presently disclosed delivery systems 10 is illustrated. Where appropriate, the reference numerals from the schematic illustrations of FIGS. 1-6 are used to designate corresponding parts of FIG. 7; however, the example of FIG. 7 is non-exclusive and does not limit delivery systems 10 to the illustrated examples of release mechanism 30 shown in FIG. 7. That is, delivery systems 10 are not limited to the specific example illustrated in FIG. 7 and may incorporate any number of the various aspects, configurations, characteristics, properties, etc. that are illustrated in and discussed with reference to the schematic representations of FIGS. 1-6 and/or the examples of FIG. 7, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in FIG. 7; however, it is within the scope of the present disclosure that the previously discussed features, variants, etc. may be utilized with the illustrated example of release mechanism 30 of delivery system 10.

As shown in FIG. 7, release mechanism 30 may include a button 40, such as a spring-loaded button 40, which may extend downwardly (e.g., towards delivery location surface 34) away from lower side 38 of release mechanism 30. Release mechanism 30 may be configured such that release mechanism 30 is actuated when a threshold force is applied to button 40. Such force may be applied to button 40, for example, by contacting delivery location surface 34 with button 40 as package 14 is lowered to delivery location surface 34. While the example of FIG. 7 illustrates just one example of button 40 in the form of a spring-loaded button 40, other examples of release mechanism 30 may include two or more buttons 40, one or more of which may be different types of buttons 40. Some examples of delivery system 10 include a plurality of spring-loaded buttons 40, with each spring-loaded button 40 being configured to at least partially actuate release mechanism 30 when a respective threshold force is applied to the respective spring-loaded button 40. In some examples, release mechanism 30 may be actuated only when all such buttons 40 experience a predetermined threshold force, while in other examples, pressure on just one or a subset of buttons 40 may be sufficient to actuate release mechanism 30. Additionally or alternatively to spring-loaded buttons 40, other types of buttons may be included on or within release mechanism 30 to actuate release mechanism 30, such as push-button electric switches.

Returning to the example of FIG. 7, button 40 may be configured to actuate release mechanism 30 when a predetermined threshold force is applied to button 40. In some examples, release mechanism 30 may be selectively adjustable such that the predetermined threshold force may be increased or decreased as desired. Criteria that may be used to select the threshold weight or force applied to button 40 for actuation of release mechanism 30 may include a vehicle weight of aerial vehicle 12 when aerial vehicle 12 is devoid of package 14, and/or a package weight of package 14 being delivered. For example, release mechanism 30 may be selectively adjusted to actuate at a higher predetermined threshold force in instances where a heavier package 14 is being delivered, and selectively adjusted to actuate at a lower predetermined threshold force in instances where a lighter package 14 is being delivered. In some examples, a kit may be provided with a plurality of different release mechanisms 30, such that a desired release mechanism 30 having a desired set of characteristics or features (e.g., a desired predetermined threshold actuation force via different weight springs in the different release mechanisms) may be selected from among a plurality of different options. In specific examples, the predetermined threshold force to actuate release mechanism 30 may be selected or set such that the threshold force is at least 10% of the weight of package 14 being delivered, at least 20% of the weight of package 14, at least 30% of the weight of package 14, at least 40% of the weight of package 14, and/or at least half the weight of package 14. In other examples, the predetermined threshold force to actuate release mechanism 30 may be selected or set at less than 0% of the weight of package 14. Additionally or alternatively, the predetermined threshold force to actuate release mechanism 30 may be selected or set at less than a pound of force being applied to button 40 (or other type of mechanism). In some examples, release mechanism 30 may be configured to actuate with only a very small amount of pressure applied to button 40, such as less than 1/10 of a pound. In other words, release mechanism 30 may be selected and/or configured to be quite sensitive. Release mechanism 30 may thus be actuated when button 40 contacts delivery location surface 34 with a predetermined sufficient amount of force, such that button 40 is pushed, or compressed, with respect to a main body 42 of release mechanism 30.

Release mechanism 30 may include one or more pins 44. Pins 44 may be spring-loaded, electrically actuated, electromechanical, and/or other types of pins 44. Release mechanism 30 may be configured such that one, some, or all of the pins 44 is/are moved, translated, and/or retracted when release mechanism 30 is actuated. For example, pins 44 may be coupled to button 40 such that pushing button 40 causes pins 44 to be translated upwardly towards upper side 36 of release mechanism 30, thereby releasing the corresponding distal end region 20 of each securement strap 16 from release mechanism 30. In other words, release mechanism 30 may be configured such that contact between button 40 and delivery location surface 34 causes movement, translation, and/or retraction of one or more pins 44. Of course, in other examples, pins 44 may be coupled to button 40 such that pushing button 40 causes pins 44 to be translated downwardly towards lower side 38 of release mechanism 30, thereby releasing the corresponding distal end region 20 of each securement strap 16 secured to the pins 44 (and thus releasing securement straps 16 from release mechanism 30). Any direction of movement of pins 44 during actuation of release mechanism 30 is within the scope of the present disclosure. In some examples, all pins 44 are moved when release mechanism 30 is actuated, while in other examples, just one pin 44 (or a subset of pins 44) is moved when release mechanism 30 is actuated. Generally, if retaining strap 24 is coupled to one of pins 44 (which may be referred to as a retaining pin 44'), that pin will not be moved or retracted, so that retaining strap 24 remains coupled to release mechanism 30 after actuation, though in other examples, retaining strap 24 may be coupled to release mechanism 30 in a manner other than via a pin 44.

Distal end region 20 of each respective securement strap 16 may include a respective ring 46 positioned around a respective pin 44, thereby coupling the respective securement strap 16 to release mechanism 30. In other words, each ring 46 may be coupled to release mechanism 30 via a respective pin 44 extending through the respective ring 46. In some examples, one or more securement straps 16 may be coupled to a single pin 44 (via rings 46, or otherwise), while in some examples one or more securement straps 16 may be coupled to a different respective pin 44 than one or more other securement straps 16. When pins 44 are retracted or pushed out of position (e.g., when release mechanism 30 is actuated), rings 46 are released from release mechanism 30 (as best illustrated in FIGS. 5-6), thereby releasing each securement strap 16 corresponding to each released ring 46. The example of release mechanism 30 shown in FIG. 7 includes three rings 46 to secure three securement straps 16 to three pins 44, though one ring 46 and securement strap 16 are not shown, for clarity. This example also may include a retaining pin 44' to secure retaining strap 24 via a ring 46, though this ring 46 is not visible in FIG. 7 due to the angle of the drawing, and retaining pin 44' may be configured to remain stationary when release mechanism 30 is actuated such that retaining strap 24 remains coupled to release mechanism 30 even when release mechanism 30 is actuated. Of course other examples of release mechanism 30 may include more or fewer securement straps 16 and/or more retaining straps 24. Ring 46 may be any suitable structure through which a pin 44 may be inserted or positioned. For example, ring 46 may be an annular ring, a D-ring, a clip, a carabiner, an O-ring, a spring ring, a key ring, a clasp, and/or any other suitable structure. In other examples, securement straps 16 may be secured to release mechanism 30 in a manner other than via rings 46 and pins 44. In a specific example, securement straps 16 may be cut to release package 14 when release mechanism 30 is actuated. Main body 42 of release mechanism 30 may be any suitable shape. In some examples, main body 42 is substantially puck-shaped, which may be round, oval, square, polygonal, or any other shape.

Release mechanism 30 may be said to have a transit configuration and a delivery configuration. For example, release mechanism 30 may be said to be in a transit configuration during flight of aerial vehicle 12, while package 14 is secured with respect to aerial vehicle 12 (e.g., FIGS. 3-4). Release mechanism 30 may be said to be in a delivery configuration once release mechanism 30 is actuated and securement straps 16 are released from release mechanism 30 (e.g., FIGS. 5-6). In some examples of delivery system 10, release mechanism 30 may be biased to return to a transit configuration when pressure is removed from button 40 (e.g., when release mechanism 30 is lifted away from delivery location surface 34 such that button 40 is no longer being pressed). In other words, if in a particular example a plurality of pins 44 are translated to release rings 46 when release mechanism 30 is actuated by contacting delivery location surface 34 with button 40, pins 44 may be spring-loaded such that they are biased to automatically translate back to their original transit positions once release mechanism 30 is lifted off of delivery location surface 34, thereby removing the pressure that was applied to spring-loaded button 40 via delivery location surface 34. In other examples, release mechanism 30 may be configured to remain in a delivery configuration (e.g., with pins 44 in a raised or lowered position) once release mechanism 30 is actuated, even if pressure is removed from button 40 of release mechanism 30, until release mechanism 30 is reset.

Figure 8:
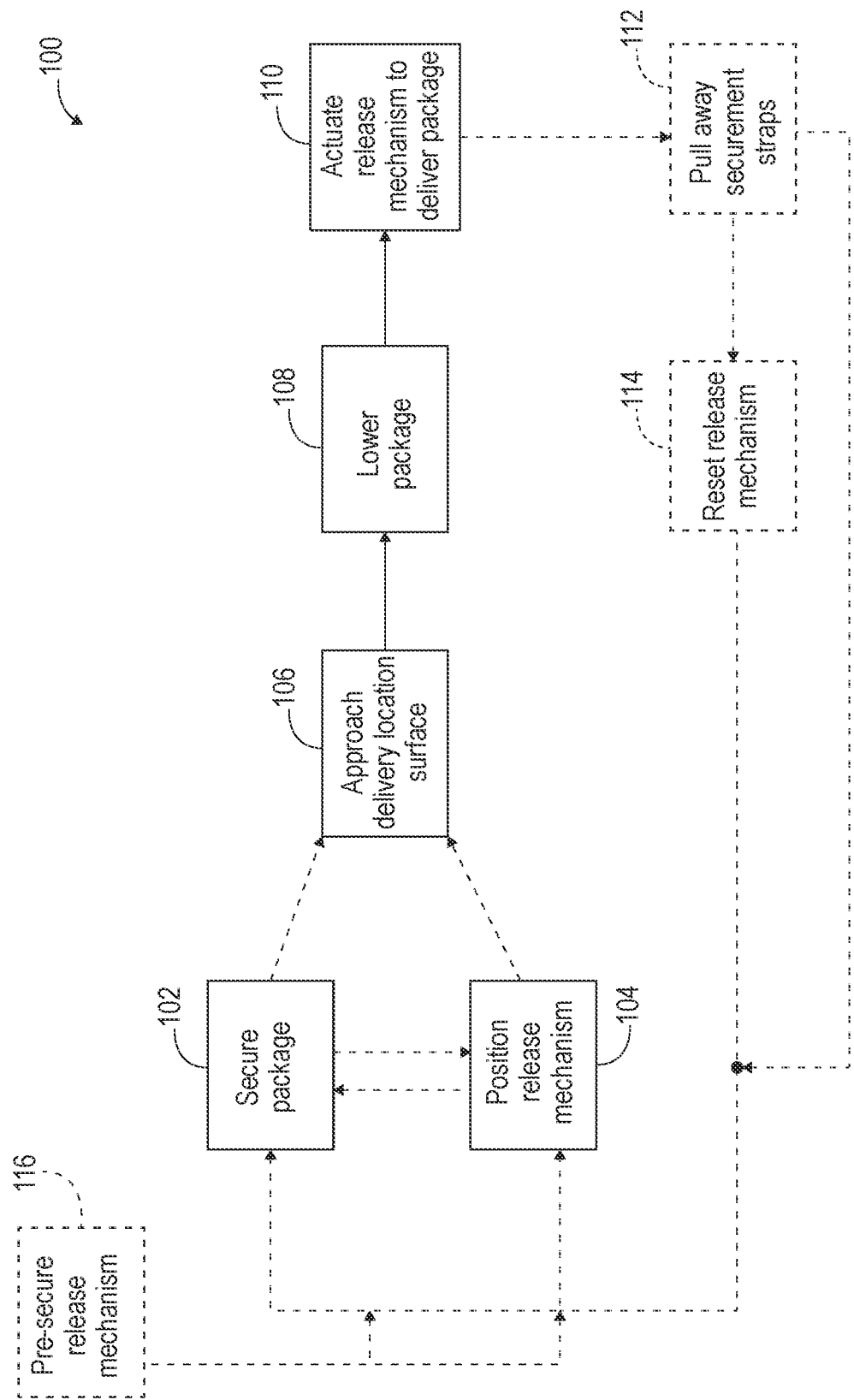
FIG. 8 is a schematic flowchart diagram representing examples of methods of delivering a package from an aerial vehicle, according to the present disclosure.

FIG. 8 schematically provides a flowchart that represents illustrative, non-exclusive examples of methods 100 for automatically delivering a package via an aerial vehicle according to the present disclosure. In FIG. 8, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 8 are not limiting and other methods and steps are within the scope of the present disclosure, including methods having greater than or fewer than the number of steps illustrated, as understood from the discussions herein.

With reference to FIGS. 2-6 and 8, methods 100 for delivering a package (e.g., package 14) via disclosed delivery systems 10 for an aerial vehicle (e.g., aerial vehicle 12) are described. Methods 100 generally include securing the package with respect to the aerial vehicle at 102, such as via a plurality of securement straps (e.g., securement straps 16), such that the package is supported during flight of the aerial vehicle. In some examples, securing the package at 102 includes positioning the package between the plurality of securement straps and at least one retaining strap (e.g., at least one retaining strap 24), and cinching the securement straps and the at least one retaining strap to tighten the securement straps and the at least one retaining strap around the package. (FIG. 2 illustrates an example of a package 14 secured via securement straps 16 and a retaining strap 24 that have been cinched snugly about the package.) While the package is secured in this manner, it may be contained at least partially within the aerial vehicle, may be secured against the body of the aerial vehicle, and/or may hang down below the aerial vehicle such that it is essentially towed slightly behind the aerial vehicle during flight. Methods 100 also include positioning a release mechanism (e.g., release mechanism 30) on or adjacent the package (e.g., on or adjacent a bottom side (e.g., bottom side 48) of the package) at 104, with the securement straps and at least one retaining strap being coupled to the release mechanism. In some examples, the securement straps may be pre-secured to the release mechanism. For example, as best seen in FIG. 1, the securement straps 16 and the at least one retaining strap 24 may be secured to the release mechanism 30 loosely such that the package 14 may be inserted into place between the securement straps. Then, the securement straps and the at least one retaining strap may be cinched down to secure the package within the straps, with the release mechanism generally being positioned on the bottom side of the package. The position of the release mechanism will generally be on a side or region of the package that is expected to make contact with a delivery location surface (e.g., delivery location surface 34) at an appropriate time to release, or deliver the package. Generally this corresponds to the bottom side of the package, as the bottom side of the package will contact the delivery location surface as the package is lowered to the delivery location surface, though in some examples, the package may be brought into a delivery location surface from the side, and thus the release mechanism may be positioned on a different side of the package in some examples.

Methods 100 then include causing the aerial vehicle to approach the delivery location surface at 106. Causing the aerial vehicle to approach the delivery location surface at 106 may include remotely operating the aerial vehicle, piloting the aerial vehicle, and/or programming the aerial vehicle such that it is configured to approach the delivery location surface via an automated/autonomous process. For example, causing the aerial vehicle to approach the delivery location surface at 106 may include causing the aerial vehicle to fly from a warehouse or other initial location of the package, and fly to a location where the package is to be delivered, such as the location of a commercial or residential recipient of the package. Methods 100 (e.g., approaching the delivery location surface at 106) generally include retaining the package with the securement straps and the at least one retaining strap until the release mechanism is actuated by contacting the delivery location surface with the release mechanism. For example, once the aerial vehicle is in the vicinity of the delivery location surface, the package may be lowered towards the delivery location surface at 108 (and as shown in FIG. 3). Lowering the package at 108 is performed while the aerial vehicle remains at a minimum predetermined height above the delivery location surface. In other words, the package is lowered to the delivery location surface without landing the aerial vehicle on the delivery location surface. The package may be lowered at 108 while the aerial vehicle is hovering high enough above the delivery location surface so as to reduce or eliminate the risk of tampering, or other interference from, or contact with people, animals, and/or landscaping.

Once the package is lowered at 108, methods 100 then include automatically actuating the release mechanism at 110, such as when the release mechanism contacts the delivery location surface. When the release mechanism contacts the delivery location surface, the release mechanism is actuated, thereby disengaging the plurality of securement straps (e.g., releasing the securement straps from their connection with the release mechanism) and delivering the package by depositing the package on the delivery location surface. FIG. 4 illustrates the release mechanism 30 contacting the delivery location surface 34 once the package 14 is lowered sufficiently, which actuates the release mechanism (e.g., by pushing the spring-loaded button 40 on the lower side 38 of the release mechanism). Again, the actuating the release mechanism at 110 by contacting the delivery location surface with the release mechanism may be performed without landing the aerial vehicle at or on the delivery location surface (e.g., without contacting the delivery location surface with the aerial vehicle). In some examples, automatically actuating the release mechanism at 110 includes automatically moving or retracting one or more pins when a button is pressed by contact with the delivery location surface, thereby releasing the plurality of securement straps from the release mechanism, such as by releasing a respective ring (e.g., ring 46) of each securement strap from a respective pin (e.g., pin 44) of the release mechanism. Additionally or alternatively, automatically actuating the release mechanism at 110 may include releasing a distal end region (e.g., distal end region 20) of at least one securement strap, with the release mechanism being configured to remain coupled to the at least one retaining strap after actuation.

FIG. 5 illustrates the scenario after the release mechanism 30 is actuated at 110, with the retaining strap 24 being coupled to the release mechanism and the securement straps 16 being released from the release mechanism, such that the package 14 is no longer secured with respect to the aerial vehicle. Once the package is released at 110, the securement straps can be pulled up and out from under the package, as illustrated in FIGS. 5-6. For example, methods 100 may include pulling the securement straps away from the package after delivering the package on the delivery location surface, at 112. Pulling away the securement straps at 112 may include, for example, lifting, winching, coiling, and/or retracting the securement straps, the retaining strap(s), and/or the release mechanism towards and/or at least partially into the aerial vehicle. Additionally or alternatively, pulling away the securement straps at 112 may include flying the aerial vehicle higher above and/or away from the delivery location surface, such that the securement straps are moved away from the package by virtue of being coupled to the aerial vehicle. In other words, pulling away the securement straps at 112 may include causing the aerial vehicle to fly away from the delivery location surface, thereby pulling the securement straps and the release mechanism away from the package.

After the package is delivered at the delivery location surface, the delivery system may be used to deliver another package, which may be a different sized or shaped package and/or may be delivered to a different location (e.g., a different delivery location surface). In some examples, the release mechanism may be reset at 114 before a subsequent package is secured with respect to the aerial vehicle. For example, in delivery systems where the release mechanism includes pins that are pushed upwards to release securement straps when the release mechanism is actuated, resetting the release mechanism at 114 may include positioning the pins back in their original lowered position such that the pins may be positioned through rings of securement straps to couple the securement straps to the release mechanism again, so that a subsequent package may be secured using the delivery system, at 102.

In some examples, securing the package at 102 also includes engaging a locking mechanism after the securing the package with respect to the aerial vehicle. The locking mechanism may be configured to prevent accidental release of the package, such as during an emergency landing and/or while the aerial vehicle is above a predetermined altitude or elevation above the delivery location surface. Additionally or alternatively, securing the package at 102 may include pre-securing a proximal end region (e.g., proximal end region 18) of each securement strap of the plurality of securement straps to the aerial vehicle, and pre-securing the distal end region of each securement strap of the plurality of securement straps to the release mechanism prior to the securing the package at 102. For example, securing the package at 102 may include pre-securing the distal end region of each securement strap of the plurality of securement straps to the release mechanism at 116 by positioning a respective pin of the release mechanism through a respective ring of each respective securement strap of the plurality of securement straps. Additionally or alternatively, securing the package at 102 may include positioning the package between the plurality of securement straps and cinching the securement straps to tighten the securement straps around the package.

In some examples, methods 100 include pre-securing a first end region (e.g., first end region 26) of the at least one retaining strap to the aerial vehicle and pre-securing a second end region (e.g., second end region 28) of the at least one retaining strap to the release mechanism, before the package is secured within the securement straps and the at least one retaining strap at 102. Because the release mechanism is configured such that actuation of the release mechanism does not disengage the at least one retaining strap from the release mechanism, the release mechanism remains coupled to the at least one retaining strap once the securement straps are released, and the at least one retaining strap thereby serves to keep the release mechanism tethered to the aerial vehicle.

Illustrative, non-exclusive examples of inventive subject matter according to the present disclosure are described in the following enumerated paragraphs:

A1. A delivery system for an aerial vehicle, the delivery system comprising:

a plurality of securement straps configured to secure a package with respect to the aerial vehicle such that the package is supported during flight of the aerial vehicle, wherein each securement strap of the plurality of securement straps extends from a proximal end region to a distal end region, and wherein the proximal end region of each securement strap of the plurality of securement straps is coupled to the aerial vehicle;

at least one retaining strap, wherein a first end region of the at least one retaining strap is coupled to the aerial vehicle, and wherein a second end region of the at least one retaining strap is coupled to a release mechanism; and the release mechanism, wherein the distal end region of each securement strap of the plurality of securement straps is coupled to the release mechanism, wherein the delivery system is configured such that when the release mechanism is actuated the release mechanism releases the distal end region of at least one securement strap of the plurality of securement straps, thereby delivering the package, and wherein the release mechanism is configured to remain coupled to the second end region of the at least one retaining strap when the release mechanism is actuated.

A1.1. The delivery system of paragraph A1, wherein the delivery system is configured such that when the release mechanism is actuated the release mechanism releases the distal end region of each securement strap of the plurality of securement straps.

A1.2. The delivery system of paragraph A1 or A1.1, wherein the proximal end region of each securement strap of the plurality of securement straps is coupled to a main line coupled to the aerial vehicle.

A1.3. The delivery system of any of paragraphs A1-A1.2, wherein the first end region of the at least one retaining strap is coupled to the aerial vehicle by a/the main line.

A1.4. The delivery system of any of paragraphs A1-A1.3, wherein the release mechanism is configured to remain coupled to a/the main line when the release mechanism is actuated.

A1.5. The delivery system of any of paragraphs A1-A1.4, wherein a/the main line is retractable such that at least a portion of the main line may be selectively retracted into the aerial vehicle.

A2. The delivery system of any of paragraphs A1-A1.5, wherein the release mechanism is passively actuated.

A2.1. The delivery system of paragraph A2, wherein the release mechanism is passively actuated when the release mechanism contacts a delivery location surface and/or when the package contacts the delivery location surface.

A2.2. The delivery system of paragraph A2 or A2.1, wherein the release mechanism is configured to be passively actuated without landing or contacting the delivery location surface with the aerial vehicle.

A2.3. The delivery system of any of paragraphs A1-A2.2, wherein the release mechanism is actively actuated.

A3. The delivery system of any of paragraphs A1-A2.3, wherein the release mechanism is pressure actuated.

A3.1. The delivery system of any of paragraphs A1-A3, wherein the release mechanism is electronically actuated.

A3.2. The delivery system of any of paragraphs A1-A3.1, wherein the release mechanism is actuated via one or more solenoids.

A4. The delivery system of any of paragraphs A1-A3.2, wherein the release mechanism is configured to be actuated by contacting a/the delivery location surface on which the delivery system is configured to deliver the package.

A5. The delivery system of any of paragraphs A1-A4, wherein the release mechanism comprises an upper side that faces and/or contacts the package until the package is delivered.

A6. The delivery system of any of paragraphs A1-A5, wherein the release mechanism comprises a lower side that faces away from the package while the package is in transit to a/the delivery location surface.

A7. The delivery system of any of paragraphs A1-A6, wherein the release mechanism is actuated by contacting a/the lower side of the release mechanism with a/the delivery location surface.

A8. The delivery system of any of paragraphs A1-A7, wherein the release mechanism comprises a spring-loaded button that actuates the release mechanism when a threshold force is applied to the spring-loaded button.

A9. The delivery system of paragraph A8, wherein the threshold force corresponds to less than a pound of force being applied to the spring-loaded button.

A9.1. The delivery system of paragraph A8 or A9, wherein the threshold force is selected and/or selectively adjusted, based on a vehicle weight of the aerial vehicle when the aerial vehicle is devoid of the package, and/or based on a package weight of the package being delivered.

A10. The delivery system of any of paragraphs A1-A9.1, wherein the release mechanism comprises a/the spring-loaded button that actuates the release mechanism when the spring-loaded button contacts a/the delivery location surface.

A11. The delivery system of any of paragraphs A1-A10, wherein the release mechanism comprises one or more pins.

A11.1. The delivery system of paragraph A11, wherein the one or more pins comprise one or more spring-loaded pins.

A11.2. The delivery system of paragraph A11 or A11.1, wherein the one or more pins comprise one or more electrically actuated pins.

A12. The delivery system of paragraph A11, wherein the release mechanism is configured such that each pin of the one or more pins is moved, translated, and/or retracted, when the release mechanism is actuated.

A13. The delivery system of paragraph A11 or A12, wherein the release mechanism is configured such that contact between a/the spring-loaded button on a/the lower side of the release mechanism and a/the delivery location surface causes movement, translation, and/or retraction of each pin of the one or more pins, thereby releasing the distal end region of each securement strap of the plurality of securement straps from the release mechanism.

A14. The delivery system of any of paragraphs A1-A13, wherein the release mechanism comprises a plurality of spring-loaded buttons, wherein each spring-loaded button of the plurality of spring-loaded buttons is configured to at least partially actuate the release mechanism when a respective threshold force is applied to a respective spring-loaded button.

A15. The delivery system of paragraph A14, wherein the release mechanism comprises a/the one or more pins, wherein actuation of a respective spring-loaded button of the plurality of spring-loaded buttons causes corresponding movement, translation, or retraction of a corresponding respective pin of the one or more pins, thereby releasing a corresponding distal end region of a respective securement strap secured to the respective pin.

A15.1. The delivery system of any of paragraphs A1-A15, wherein the release mechanism comprises a plurality of switches (e.g., push button switches), wherein each switch of the plurality of switches is configured to at least partially actuate the release mechanism when a respective threshold force is applied to a respective switch.

A15.2. The delivery system of paragraph A15.1, wherein the release mechanism comprises a/the one or more pins, wherein actuation of a respective switch of the plurality of switches causes corresponding movement, translation, or retraction of a corresponding respective pin of the one or more pins, thereby releasing a corresponding distal end region of a respective securement strap secured to the respective pin.

A16. The delivery system of any of paragraphs A1-A15.2, wherein the distal end region of each securement strap of the plurality of securement straps comprises a respective ring configured to couple the respective securement strap to the release mechanism.

A17. The delivery system of paragraph A16, wherein each respective ring is coupled to the release mechanism via a respective spring-loaded pin extending through the respective ring.

A18. The delivery system of paragraph A17, wherein actuation of the release mechanism releases one or more ring, thereby releasing each securement strap corresponding to each released ring.

A19. The delivery system of any of paragraphs A1-A18, wherein the release mechanism is biased to return to a transit configuration when pressure is removed from a/the spring-loaded button of the release mechanism.

A20. The delivery system of any of paragraphs A1-A18, wherein the release mechanism is configured to remain in a delivery configuration once the release mechanism is actuated, even if pressure is removed from a/the button of the release mechanism, until the release mechanism is reset.

A21. The delivery system of any of paragraphs A1-A20, wherein the release mechanism comprises a puck of any shape.

A22. The delivery system of any of paragraphs A1-A21, wherein the delivery system is configured to deliver a plurality of different sizes and shapes of packages.

A23. The delivery system of any of paragraphs A1-A22, wherein the delivery system is configured to deliver a standard package without special features.

A24. The delivery system of any of paragraphs A1-A23, wherein the delivery system is configured to release the package without the aerial vehicle landing at a/the delivery location surface.

A25. The delivery system of any of paragraphs A1-A24, wherein the delivery system is configured to release the package while the aerial vehicle remains at a height above a/the delivery location surface.

A26. The delivery system of paragraph A25, wherein the height is at least 10 feet, at least 20 feet, at least 30 feet, at least 40 feet, and/or at least 50 feet.

A27. The delivery system of any of paragraphs A1-A26, further comprising a retractable line coupling each securement strap of the plurality of securement straps and the at least one retaining strap to the aerial vehicle, wherein the retractable line is configured to lower the securement straps and the at least one retaining strap away from the aerial vehicle towards a/the delivery location surface to deliver the package.

A28. The delivery system of any of paragraphs A1-A27, wherein the release mechanism is positioned on or adjacent a bottom side of the package.

A29. The delivery system of any of paragraphs A1-A28, wherein the plurality of securement straps are positioned to extend along respective sides of the package and are joined together on a/the bottom side of the package via the release mechanism.

A30. The delivery system of any of paragraphs A1-A29, wherein the at least one retaining strap is configured to retain the package along with the securement straps.

A31. The delivery system of any of paragraphs A1-A30, wherein the aerial vehicle is configured to lift away from a/the delivery location surface once the package has been delivered thereon, thereby pulling the securement straps, the at least one retaining strap, and the release mechanism away from the package and the delivery location surface.

A32. The delivery system of any of paragraphs A1-A31, wherein the delivery system is configured such that the securement straps, the at least one retaining strap, and the release mechanism are retracted into or against the aerial vehicle after the package is delivered.

A33. The delivery system of any of paragraphs A1-A32, further comprising a winch or a retractable spool configured to pull the securement straps, the at least one retaining strap, and the release mechanism in towards the aerial vehicle after the package is delivered.

A34. The delivery system of any of paragraphs A1-A33, wherein the delivery system is configured such that the release mechanism is pulled out from under the package as the aerial vehicle lifts away from a/the delivery location surface after the package is delivered onto the delivery location surface.

A35. The delivery system of any of paragraphs A1-A34, wherein the securement straps are configured to be pre-secured to the release mechanism and cinched down snug against the package once the package is positioned within the securement straps.

A36. The delivery system any of paragraphs A1-A35, wherein the delivery system is an automatic package delivery system.

A37. The delivery system any of paragraphs A1-A36, further comprising a locking mechanism configured to prevent accidental release of the package during an emergency landing and/or above a predetermined altitude or elevation above a/the delivery location surface.

B1. An aerial vehicle comprising the delivery system of any of paragraphs A1-A37.

C1. A method for delivering a package via a delivery system for an aerial vehicle, the method comprising:
securing the package with respect to the aerial vehicle via a plurality of securement straps, such that the package is supported during flight of the aerial vehicle;
positioning a release mechanism on or adjacent a lower side of the package, wherein the plurality of securement straps are coupled to the release mechanism, and wherein at least one retaining strap is coupled to the release mechanism;
causing the aerial vehicle to approach a delivery location surface;
lowering the package towards the delivery location surface while the aerial vehicle remains at a minimum predetermined height above the delivery location surface; and
automatically actuating the release mechanism when the release mechanism contacts the delivery location surface, wherein the release mechanism is configured to disengage the plurality of securement straps upon being actuated, thereby delivering the package by depositing the package on the delivery location surface.

C2. The method of paragraph C1, wherein the delivery system comprises the delivery system of any of paragraphs A1-A37.

C3. The method of any of paragraphs C1-C2, further comprising pre-securing a proximal end region of each securement strap of the plurality of securement straps to the aerial vehicle and pre-securing a distal end region of each securement strap of the plurality of securement straps to the release mechanism prior to the securing the package.

C3.1. The method of paragraph C3, wherein each respective securement strap of the plurality of securement straps comprises a respective ring coupled to the respective distal end region, and wherein the pre-securing the distal end region of each securement strap of the plurality of securement straps to the release mechanism comprises positioning a respective pin of the release mechanism through a respective ring of each respective securement strap of the plurality of securement straps.

C4. The method of any of paragraphs C1-C3.1, wherein the securing the package comprises positioning the package between the plurality of securement straps and cinching the securement straps to tighten the securement straps around the package.

C5. The method of any of paragraphs C1-C4, further comprising pre-securing a first end region of the at least one retaining strap to the aerial vehicle and pre-securing a second end region of the at least one retaining strap to the release mechanism, wherein the release mechanism is configured such that actuation of the release mechanism does not disengage the at least one retaining strap from the release mechanism.

C6. The method of paragraph C5, wherein the securing the package comprises positioning the package between the plurality of securement straps and the at least one retaining strap, and cinching the securement straps and the at least one retaining strap to tighten the securement straps and the at least one retaining strap around the package.

C7. The method of any of paragraphs C1-C6, wherein the automatically actuating the release mechanism comprises retracting one or more pins, thereby releasing the plurality of securement straps from the release mechanism by releasing a/the respective ring of each securement strap of the plurality of securement straps from each respective pin of the one or more pins.

C8. The method of any of paragraphs C1-C7, wherein the automatically actuating the release mechanism comprises releasing a/the distal end region of at least one securement strap of the plurality of securement straps, and wherein the release mechanism is configured to remain coupled to the at least one retaining strap.

C9. The method of any of paragraphs C1-C8, further comprising lifting, winching, and/or retracting the securement straps away from the package after delivering the package on the delivery location surface.

C10. The method of any of paragraphs C1-C9, further comprising lifting, winching, and/or retracting the securement straps, the at least one retaining strap, and the release mechanism towards and/or into the aerial vehicle, after delivering the package on the delivery location surface.

C11. The method of any of paragraphs C1-C10, further comprising causing the aerial vehicle to fly away from the delivery location surface, thereby pulling the securement straps and the release mechanism away from the package.

C12. The method of any of paragraphs C1-C11, further comprising retaining the package with the securement straps and the at least one retaining strap until the release mechanism is actuated by contacting the delivery location surface with the release mechanism.

C13. The method of any of paragraphs C1-C12, wherein the actuating the release mechanism by contacting the delivery location surface with the release mechanism is performed without landing the aerial vehicle at or on the delivery location surface.

C14. The method of any of paragraphs C1-C13, further comprising resetting the release mechanism, thereby enabling the securement straps to be secured to the release mechanism again, to deliver a subsequent package.

C15. The method of any of paragraphs C1-C14, further comprising engaging a locking mechanism after the securing the package with respect to the aerial vehicle, wherein the locking mechanism is configured to prevent accidental release of the package during an emergency landing and/or above a predetermined altitude or elevation above the delivery location surface.

E1. The use of the delivery system of any of paragraphs A1-A37 to deliver a package via an aerial vehicle.

As used herein, the terms "selective" and "selectively," when modifying an action, movement, configuration, or other activity of one or more components or characteristics of an apparatus, mean that the specific action, movement, configuration, or other activity is a direct or indirect result of dynamic processes and/or user manipulation of an aspect of, or one or more components of, the apparatus. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, or A, B, and C together, and optionally any of the above in combination with at least one other entity.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein. As used herein, the phrase, "for example," the phrase, "as an example," and/or simply the term "example," when used with reference to one or more components, features, details, structures, examples, and/or methods according to the present disclosure, are intended to convey that the described component, feature, detail, structure, example, and/or method is an illustrative, non-exclusive example of components, features, details, structures, examples, and/or methods according to the present disclosure. Thus, the described component, feature, detail, structure, example, and/or method is not intended to be limiting, required, or exclusive/exhaustive; and other components, features, details, structures, examples, and/or methods, including structurally and/or functionally similar and/or equivalent components, features, details, structures, examples, and/or methods, are also within the scope of the present disclosure.

The invention claimed is:

1. A delivery system for an aerial vehicle, the delivery system comprising:
   a plurality of securement straps configured to secure a package with respect to the aerial vehicle such that the package is supported during flight of the aerial vehicle, wherein each securement strap of the plurality of securement straps extends from a proximal end region to a distal end region, and wherein the proximal end region of each securement strap of the plurality of securement straps is coupled to the aerial vehicle;
   at least one retaining strap, wherein a first end region of the at least one retaining strap is coupled to the aerial vehicle, and wherein a second end region of the at least one retaining strap is coupled to a release mechanism; and
   the release mechanism, wherein the distal end region of each securement strap of the plurality of securement straps is coupled to the release mechanism, wherein the delivery system is configured such that when the release mechanism is actuated the release mechanism releases the distal end region of at least one securement strap of the plurality of securement straps, thereby delivering the package, and wherein the release mechanism is configured to remain coupled to the second end region of the at least one retaining strap when the release mechanism is actuated.

2. The delivery system according to claim 1, wherein the delivery system is configured such that when the release mechanism is actuated the release mechanism releases the distal end region of each securement strap of the plurality of securement straps.

3. The delivery system according to claim 1, wherein the delivery system is configured such that the release mechanism is passively actuated when the release mechanism contacts a delivery location surface on which the package is to be delivered.

4. The delivery system according to claim 1, wherein the release mechanism comprises a spring-loaded button that actuates the release mechanism when a threshold force is applied to the spring-loaded button by contact between the spring-loaded button and a delivery location surface on which the package is to be delivered.

5. The delivery system according to claim 1, wherein the delivery system is configured to deliver a plurality of different sizes and shapes of packages.

6. The delivery system according to claim 1, wherein the delivery system is configured to release the package while the aerial vehicle remains at a height above a delivery location surface where the package is to be delivered, wherein the height is at least 10 feet above the delivery location surface.

7. The delivery system according to claim 1, further comprising a retractable line coupling each securement strap and the at least one retaining strap to the aerial vehicle, wherein the retractable line is configured to lower the plurality of securement straps and the at least one retaining strap away from the aerial vehicle towards a delivery location surface to deliver the package.

8. The delivery system according to claim 1, wherein the release mechanism is positioned on or adjacent a bottom side of the package, and wherein the plurality of securement straps are positioned to extend along respective sides of the package and are joined together on the bottom side of the package via the release mechanism.

9. The delivery system according to claim 1, wherein the aerial vehicle is configured to lift away from a delivery location surface once the package has been delivered thereon, thereby pulling the plurality of securement straps, the at least one retaining strap, and the release mechanism away from the package and the delivery location surface.

10. The delivery system according to claim 1, wherein the delivery system is configured such that the plurality of securement straps, the at least one retaining strap, and the release mechanism are retracted into or against the aerial vehicle after the package is delivered.

11. The delivery system according to claim 1, wherein the release mechanism comprises one or more pins.

12. The delivery system according to claim 11, wherein the release mechanism is configured such that each pin of the one or more pins is retracted when the release mechanism is actuated, thereby releasing the distal end region of each securement strap of the plurality of securement straps from the release mechanism.

13. The delivery system according to claim 12, wherein the distal end region of each securement strap of the plurality of securement straps comprises a ring, wherein each respective ring is coupled to the release mechanism via a respective pin of the one or more pins extending through the respective ring.

14. An aerial vehicle comprising the delivery system according to claim 1.

15. A method for delivering a package via a delivery system for an aerial vehicle, the method comprising:
    securing the package with respect to the aerial vehicle via a plurality of securement straps, such that the package is supported during flight of the aerial vehicle;
    positioning a release mechanism on or adjacent a lower side of the package, wherein the plurality of securement straps are coupled to the release mechanism, and wherein at least one retaining strap is coupled to the release mechanism;
    causing the aerial vehicle to approach a delivery location surface;
    lowering the package towards the delivery location surface while the aerial vehicle remains at a minimum predetermined height above the delivery location surface; and
    automatically actuating the release mechanism when the release mechanism contacts the delivery location surface, wherein the release mechanism is configured to disengage the plurality of securement straps upon being actuated, thereby delivering the package by depositing the package on the delivery location surface.

16. The method according to claim 15, further comprising pre-securing a first end region of the at least one retaining strap to the aerial vehicle and pre-securing a second end region of the at least one retaining strap to the release mechanism, wherein the release mechanism is configured such that actuation of the release mechanism does not disengage the at least one retaining strap from the release mechanism.

17. The method according to claim 15, wherein the securing the package comprises positioning the package between the plurality of securement straps and the at least one retaining strap, and cinching the plurality of securement straps and the at least one retaining strap to tighten the securement straps and the at least one retaining strap around the package.

18. The method according to claim 15, wherein the automatically actuating the release mechanism comprises retracting one or more pins, thereby releasing the plurality of securement straps from the release mechanism by releasing a respective ring of each securement strap of the plurality of securement straps from a respective pin of the one or more pins, and wherein the release mechanism is configured to remain coupled to the at least one retaining strap after the release mechanism is actuated.

19. The method according to claim 15, further comprising lifting, winching, and/or retracting the plurality of securement straps, the at least one retaining strap, and the release mechanism away from the package after delivering the package on the delivery location surface.

20. The method according to claim 15, wherein the automatically actuating the release mechanism by contacting the delivery location surface with the release mechanism is performed without landing the aerial vehicle at or on the delivery location surface.

* * * * *

UNITED STATES PATENT AND TRADEMARK OFFICE
CERTIFICATE OF CORRECTION

| | |
|---|---|
| PATENT NO. | : 11,691,731 B2 |
| APPLICATION NO. | : 17/482258 |
| DATED | : July 4, 2023 |
| INVENTOR(S) | : John Richard Wong and Derek Suggs |

It is certified that error appears in the above-identified patent and that said Letters Patent is hereby corrected as shown below:

On the Title Page

At "(71) Applicant," the text should be changed to --INSITU, INC., a subsidiary of THE BOEING COMPANY, Bingen, WA (US)--; and At "(73) Assignee," the text should be changed to --INSITU, INC., a subsidiary of THE BOEING COMPANY, Bingen, WA (US)--.

Signed and Sealed this
Twenty-sixth Day of September, 2023

*Katherine Kelly Vidal*

Katherine Kelly Vidal
*Director of the United States Patent and Trademark Office*